United States Patent
Satoh et al.

[11] Patent Number: 6,139,163
[45] Date of Patent: Oct. 31, 2000

[54] PLANAR LIGHT SOURCE UNIT

[75] Inventors: Kazuo Satoh; Akira Onikiri; Michifusa Watanabe, all of Fujiyoshida, Japan

[73] Assignee: Citizen Electronics Co., Ltd., Fujiyoshida, Japan

[21] Appl. No.: 09/325,634

[22] Filed: Jun. 4, 1999

[30] Foreign Application Priority Data

Jun. 5, 1998 [JP] Japan .................................. 10-172074

[51] Int. Cl.[7] .................................................. F21V 7/00
[52] U.S. Cl. .............................................. 362/31; 362/298
[58] Field of Search .............................. 362/31, 298, 300, 362/301, 303

[56] References Cited

U.S. PATENT DOCUMENTS

| | | | |
|---|---|---|---|
| 3,609,960 | 10/1971 | Huther | 362/26 |
| 4,860,170 | 8/1989 | Sakakibara et al. | 362/26 |
| 5,083,240 | 1/1992 | Pasco | 362/26 |
| 5,515,244 | 5/1996 | Levins et al. | 362/26 |
| 5,727,862 | 3/1998 | Wu | 362/26 |
| 5,746,493 | 5/1998 | Jonsson et al. | 362/26 |
| 6,065,845 | 5/2000 | Miyazaki | 362/26 |

*Primary Examiner*—Thomas M. Sember
*Attorney, Agent, or Firm*—Dennison, Scheiner, Schultz & Wakeman

[57] ABSTRACT

A transparent planar light leading plate is provided adjacent to a light source, and a hole is formed in the light leading plate at a position opposite to the light source. The hole has an inverted triangular shape, opposite sides of the hole are provided for reflecting light beams emitted from the light source.

22 Claims, 5 Drawing Sheets

PLANAR LIGHT SOURCE UNIT

BACKGROUND OF THE INVENTION

The present invention relates to a planar light source unit for emitting a linear light beam, which unit is used in a display having a backlight device.

In recent years, the liquid crystal display device having the backlight device is used in the notebook personal computer, desktop personal computer, and others.

FIG. 10 is a perspective view showing a conventional planar light source unit, and FIG. 11 is a sectional side view. In the drawings, reference numeral 10 designates a planar light source unit which comprises a transparent light leading plate 1 made of plastic and formed into a rectangular parallelepiped, and a plurality of LEDs 2 linearly mounted on a print substrate (not shown). The light leading member 1 has a light discharge surface 1a and a light diffusing plane 1b. On the light diffusing plane 1b, a plurality of embossed grooves or embossed dots 1c are formed, so that light is reflected from the diffusing plane 1b to the light discharge surface 1a.

On the light diffusing plane 1b, a reflection plate 3 made of a white plastic sheet is attached so as to reflect the light passing through the light diffusing plate 1b.

The light discharged from the light discharge surface 1a irradiates a liquid crystal display panel 7 from the back of the panel.

By adjusting the density of the embossed wrinkle or dots 1c, or by changing the shape of the dot 1c, it is possible to somewhat equally irradiate the liquid crystal display panel 7. In order to equally irradiate the panel, the number of the LEDs 2 must be increased. However, the increase of the number of the LEDs causes the manufacturing cost, the size of the unit, and power consumption to increase.

SUMMARY OF THE INVENTION

An object of the present invention is to provide a planar light source unit which may uniformly irradiate an object with a small number of LEDs, thereby reducing the size of the unit, the manufacturing cost, and the power consumption thereof.

According to the present invention, there is provided a planar light source unit comprising, at least one light source, a transparent light leading plate provided adjacent to the light source, the light leading plate having a light discharge surface and a light diffusing plane opposite to the light discharge surface, an incidence surface formed in the light leading plate opposite to the light source, a V-shaped light reflecting side formed on a side of the light leading plate at both sides of the incidence surface, at least one hole formed in the light leading plate at a position opposite to the light source, the hole having an inverted triangular shape, opposite sides of the hole being provided for reflecting light beams emitted from the light source.

A plurality of light reflecting recesses are formed in the V-shaped light reflecting side.

Each of the opposite sides of the hole is formed by a part of a parabolic line surface.

The light source may comprise a plurality of light sources.

The light leading plate may have a rectangular shape, and the light source is provided at one of corners of the rectangular shape.

The density of the light reflecting recesses becomes increased toward a side far from the light source.

The light sources may comprise a light source of red, a light source of green, and a light source of blue.

These and other objects and features of the present invention will become more apparent from the following detailed description with reference to the accompanying drawings.

DETAILED DESCRIPTION OF THE PREFERRED EMBODIMENT

Figure 1:
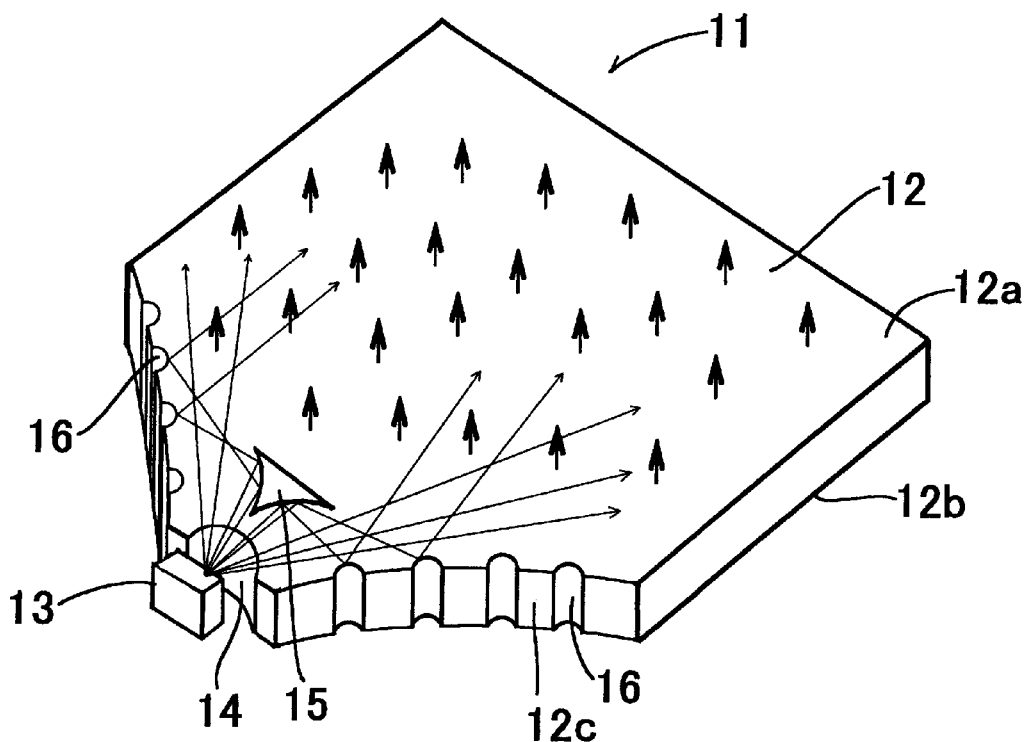
FIG. 1 is a perspective view showing a planar light source unit of a first embodiment of the present invention.
Figure 2:
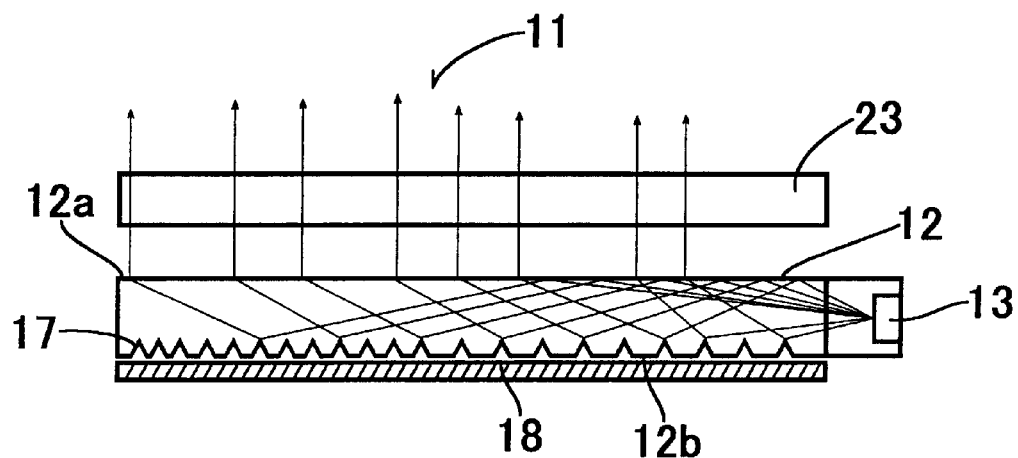
FIG. 2 is a sectional view of the unit.

Referring to FIG. 1 showing the first embodiment of the present invention, a planar light source unit 11 comprises a transparent light leading plate 12 made of plastic and formed into a flat plate, and an LED 13 of white mounted on a print substrate (not shown) as a light source. The light leading plate 12 has a light discharge surface 12a, a light diffusing plane 12b, and a V-shaped reflecting side 12c. The LED 13 is located at a central position of the V-shaped reflecting side 12c of the light leading plate 12.

In order to uniformly distribute the light quantity on the LED 13, an incidence portion 14 having a semicircular cylindrical shape is formed at the center of the V-shaped reflection side 12c in front of the LED 13.

On the V-shaped reflection side 12c, a plurality of reflection recesses 16 are formed. Each reflection recess 16 has a semicircular cylindrical shape the axis of which is disposed in the thickness direction of the light leading plate 12. The distribution density of the reflection recesses 16 becomes large, as the position of the recess becomes far from the LED 13.

The light leading plate 12 has a central through hole 15 at a position opposite to the LED 13. The hole 15 has a substantially inverted isosceles triangular shape. It is preferable that each side of the triangular hole 15 has a parabolic inside surface.

The light diffusing plane 12b has a plurality of embossed grooves or embossed dots 17 as is in the conventional unit. The distribution density of embossed dots becomes increased toward a side far from the light source.

On the light diffusing plane 12b, a reflection plate or sheet 18 made of a white plastic is attached so as to reflect the light passing through the light diffusing plate 12b.

Figure 3:
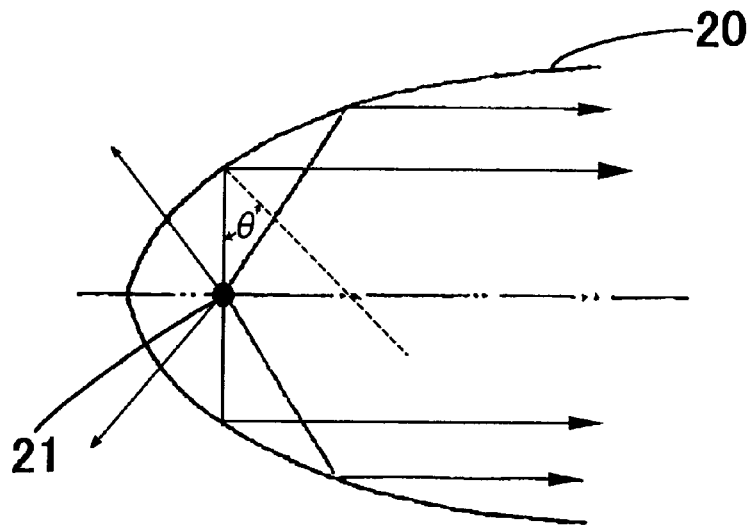
FIG. 3 is an illustration explaining light paths by a parabolic surface.

FIG. 3 shows condition of reflection and refraction of light on a parabolic inside wall 20. Light beams emitted from a focus 21 are reflected from the parabolic inside surface 20 to form parallel light beams. The light beam to be reflected must have an incident angle larger than the critical angle θ.

Figure 4:
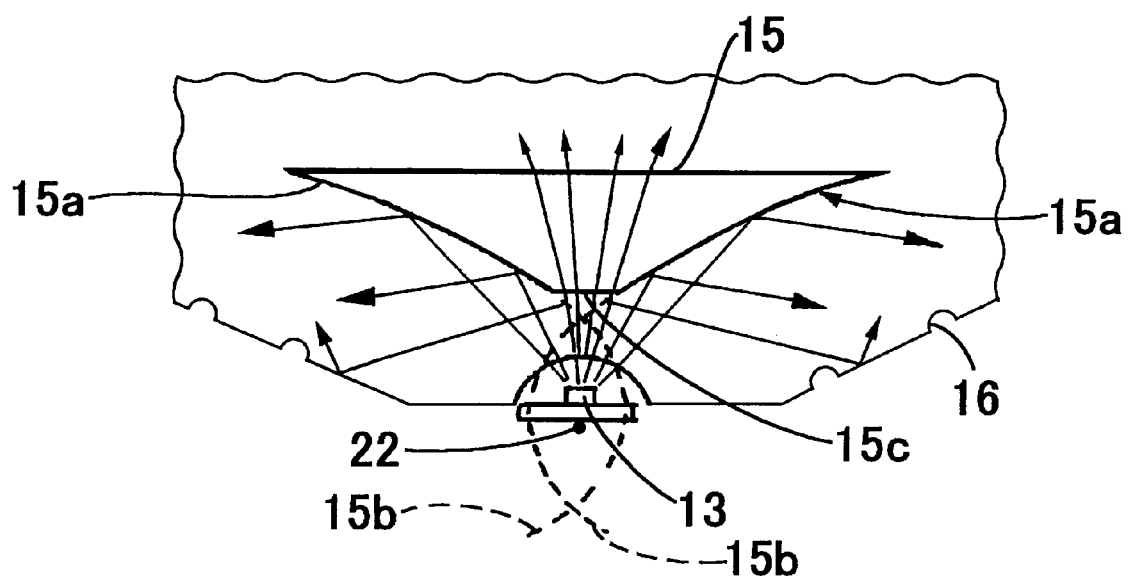
FIG. 4 is a front view showing light paths in the unit of FIG. 1.

Referring to FIG. 4, each of both inside walls 15a of the hole is formed by a part of a parabolic line 15b. Each of the parabolic reflection surfaces 15a is properly selected from the parabolic lines 15b, so that light beams from the LED 13 may be reflected without uselessness. Furthermore, the LED 13 is located at a common focus 22 of both parabolic lines 15b or at a position adjacent the focus so that the light beams are further effectively reflected.

However, if the light is entirely reflected from the inside walls 15a, the light quantity discharged from a region immediately upper portion of the LED decreases, rendering an irradiated surface dark. In order to remove such a defect, a flat plane 15c is formed at a vertex of the hole 15 opposite to the LED, so that light beams pass through the surface without reflecting as shown.

In addition, since the density of the reflection recesses 16 is progressively increased toward both sides of the light leading plate, the quantity of the reflected light is prevented from reducing at both sides.

Thus, a liquid crystal display panel 23 is uniformly irradiated by the light discharged from the light discharge surface 12a.

Figure 5:
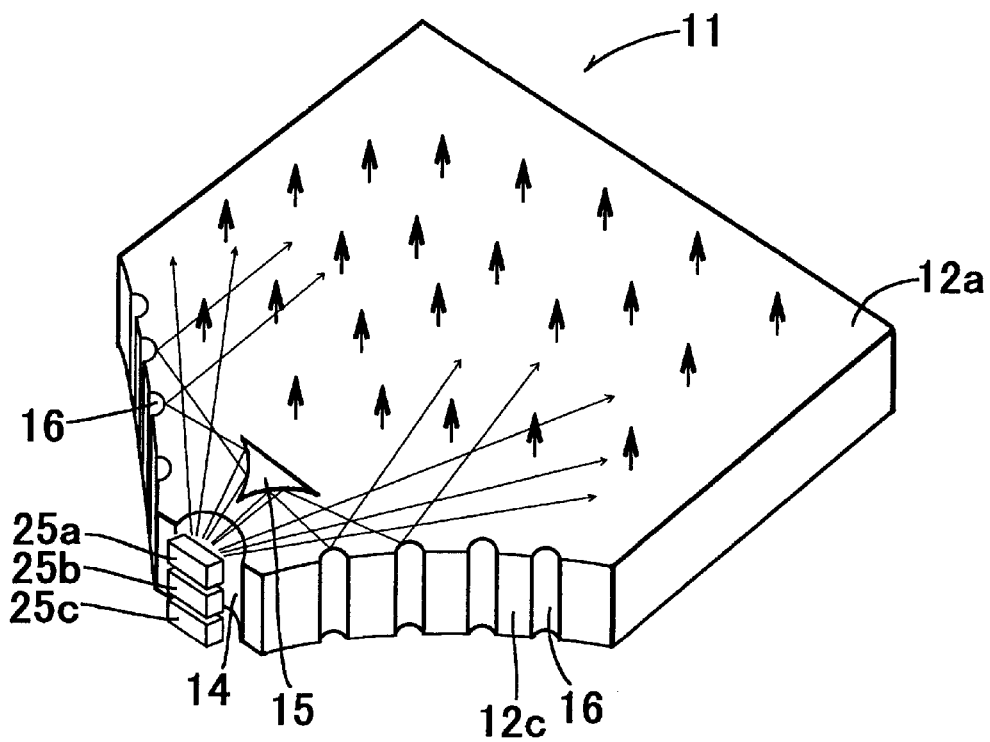
FIG. 5 is a perspective view showing a second embodiment of the present invention.
Figure 6:
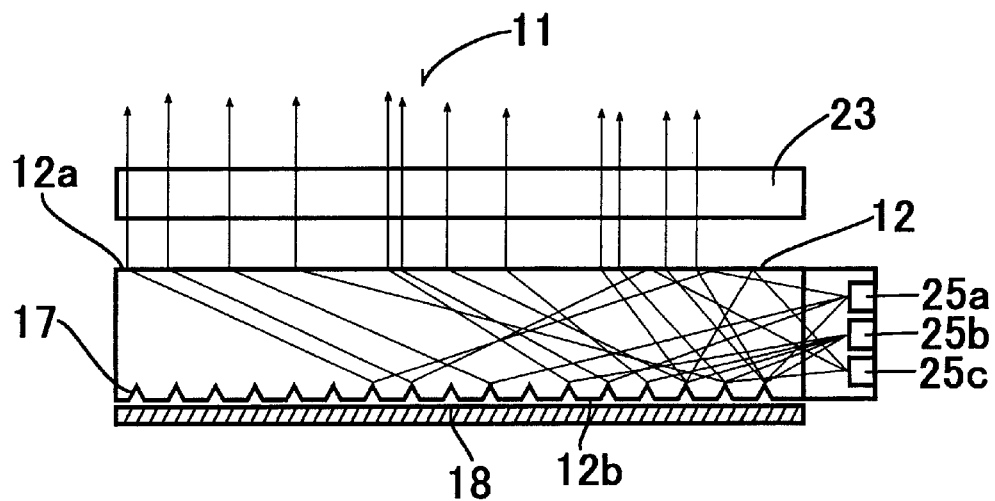
FIG. 6 is a sectional view of the second embodiment.

Referring to FIGS. 5 and 6 showing the second embodiment of the present invention, three LEDs 25a of red, 25b of green and 25c of blue are provided and arranged in the thickness direction of the light leading plate 12. Other structures are the same as the first embodiment.

In accordance with the second embodiment, the liquid crystal display panel 23 can be irradiated with various colors by controlling the operation of each of the LEDs 25a, 25b and 25c.

Figure 7:
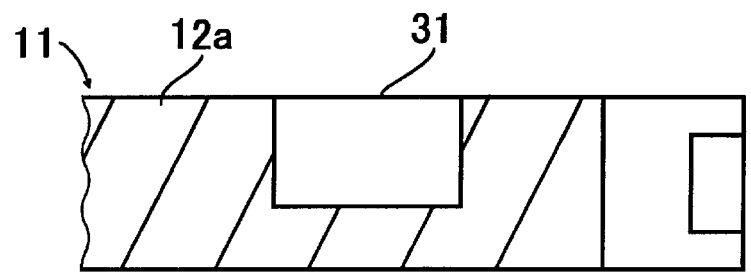
FIG. 7 is a sectional view showing a part of a modification of the first embodiment.

FIG. 7 is a sectional view showing a part of a modification of the first embodiment. A hole 31 is not a through hole, but a blind hole. By changing the depth of the hole 31, the quantity of light discharged from the light discharge surface 12a can be changed.

Figure 8:
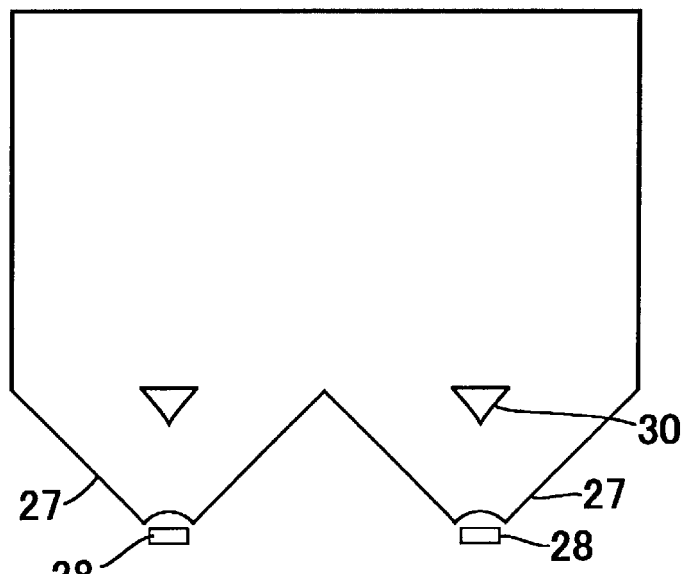
FIG. 8 is a schematic illustration showing a third embodiment of the present invention.

FIG. 8 schematically shows the third embodiment. The light source unit has two V-shaped reflection planes 27 laterally arranged. LEDs 28 and holes 30 are provided at every corner.

According to the third embodiment, a wide surface can be irradiated.

Figure 9:
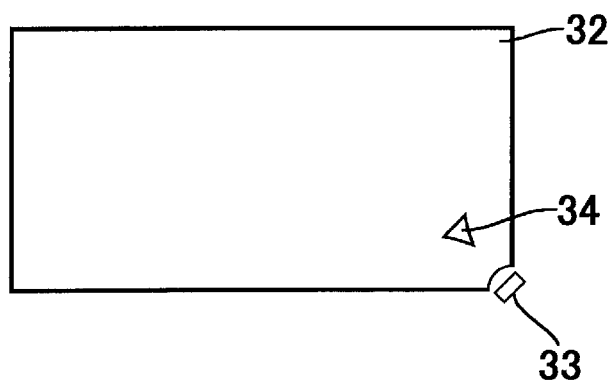
FIG. 9 is a schematic illustration showing a fourth embodiment of the present invention.
Figure 10:
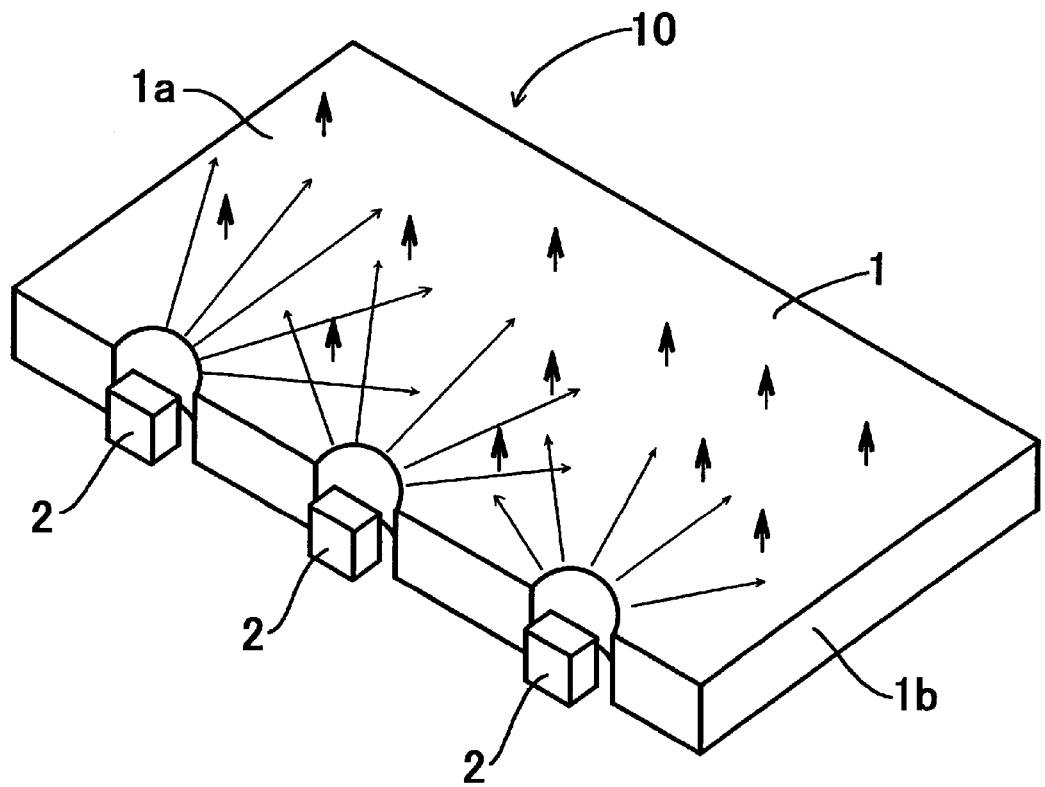
FIG. 10 is a perspective view showing a conventional planar light source unit.
Figure 11:
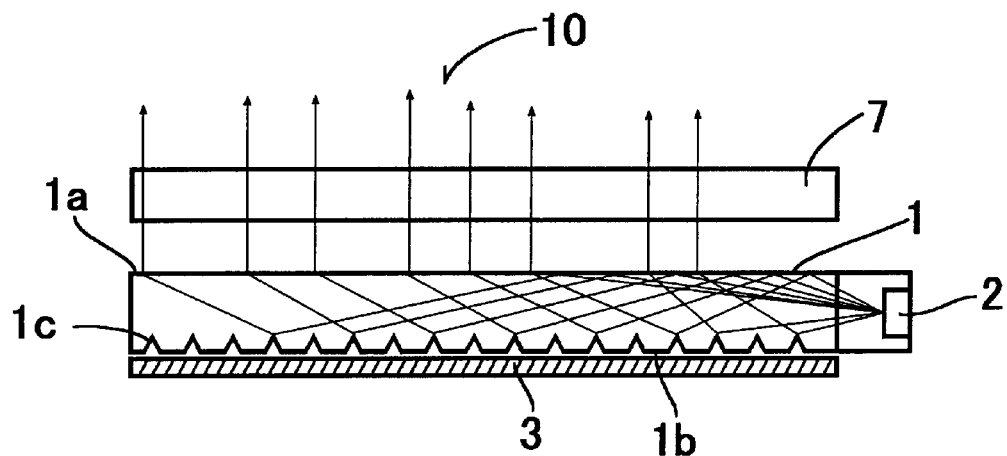
FIG. 11 is a sectional side view of the conventional planar light source unit.

FIG. 9 schematically shows the fourth embodiment of the present invention.

The light source unit has a light leading plate 32 having a rectangular shape. An LED 33 and a hole 34 are provided at one of the corners.

According to the fourth embodiment, the light leading plate 32 can be made into the same size and same shape as the liquid crystal display panel. Therefore, the display including the light source unit can be reduced in size.

In accordance with the present invention, at least one hole is formed in the transparent light leading plate at a position above a light source. Light beams emitted from the light source is linearly and uniformly diffused by reflection and refraction at the hole. By changing the shape and the number of hole, the radiating direction of the light beams can be properly adjusted.

Thus, it is possible to uniformly irradiate a large area by a small number of the light sources. As a result, the manufacturing cost of the planar light source unit can be reduced, the unit can be miniaturized.

While the invention has been described in conjunction with preferred specific embodiment thereof, it will be understood that this description is intended to illustrate and not limit the scope of the invention, which is defined by the following claims.

What is claimed is:

1. A planar light source unit comprising:
a transparent light leading plate;
the light leading plate having a light discharge surface and a light diffusing plane opposite to the light discharge surface;
a V-shaped light reflecting side formed on a side of the light leading plate;
an incidence surface formed at a vertex of the V-shape of the V-shaped light reflecting side;
at least one light source provided opposite to the incidence surface;
at least one hole formed in the light leading plate at a position opposite to the incidence surface;
the hole having an inverted triangular shape, opposite sides of the hole being provided for reflecting light beams emitted from the light source.

2. The planar light source unit according to claim 1 further comprising a plurality of light reflecting recesses formed in the V-shaped light reflecting side.

3. The planar light source unit according to claim 2 wherein the light reflecting recess has a semicircular cylindrical shape.

4. The planar light source unit according to claim 3 wherein the light reflecting recesses are arranged in parallel with respect to a thickness direction of the light leading plate.

5. The planar light source unit according to claim 2 wherein the distribution density of the light reflecting recesses becomes increased toward a side far from the light source.

6. The planar light source unit according to claim 1 wherein the incidence surface has a semicircular cylindrical shape.

7. The planar light source unit according to claim 1 wherein each of the opposite sides of the hole is formed by a part of a parabolic line surface.

8. The planar light source unit according to claim 1 wherein the hole is a through hole.

9. The planar light source unit according to claim 1 wherein the hole is a blind hole.

10. The planar light source unit according to claim 1 wherein the light source comprises plural light sources.

11. The planar light source unit according to claim 10 wherein the light sources comprise a light source of red, a light source of green, and a light source of blue.

12. The planar light source unit according to claim 10 wherein the light sources are arranged in a thickness direction of the light leading plate.

13. The planar light source unit according to claim 1 wherein the light leading plate has a square shape, and the light source is provided at one of corners of the square shape.

14. The planar light source unit according to claim 1 wherein the light leading plate has plural V-shaped light reflecting sides, and the light source is provided opposite to the incidence surface of each light reflecting side.

15. The planar light source unit according to claim 1 wherein the light source is an LED.

16. The planar light source unit according to claim 15 wherein the LED is a white LED.

17. The planar light source unit according to claim 1 wherein a plurality of embossed grooves are formed on the light diffusing plane of the light leading plate.

18. The planar light source unit according to claim 1 wherein a plurality of embossed dots are formed on the light diffusing plane of the light leading plate.

19. The planar light source unit according to claim 18 wherein a distribution density of the dots becomes increased toward a side far from the light source.

20. The planar light source unit according to claim 1 further comprising a reflecting plate of white attached on the light diffusing plane.

21. The planar light source unit according to claim 1 further comprising a reflecting sheet of white attached on the light diffusing plane.

22. The planar light source unit according to claim 1 wherein the hole has a flat plane at a vertex opposite to the light source.

* * * * *